US012410528B2

(12) United States Patent
Neumann et al.

(10) Patent No.: US 12,410,528 B2
(45) Date of Patent: Sep. 9, 2025

(54) AEROBIC ELECTROCATALYTIC OXIDATION OF HYDROCARBONS

(71) Applicant: YEDA RESEARCH AND DEVELOPMENT CO. LTD., Rehovot (IL)

(72) Inventors: Ronny Neumann, Kfar Saba (IL); Yehonatan Kaufman, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 0 days.

(21) Appl. No.: 18/002,661

(22) PCT Filed: Jun. 17, 2021

(86) PCT No.: PCT/IL2021/050734
§ 371 (c)(1),
(2) Date: Dec. 21, 2022

(87) PCT Pub. No.: WO2021/260679
PCT Pub. Date: Dec. 30, 2021

(65) Prior Publication Data
US 2023/0235464 A1 Jul. 27, 2023

(30) Foreign Application Priority Data

Jun. 22, 2020 (IL) .......................... 275588

(51) Int. Cl.
| C25B 3/07 | (2021.01) |
| C25B 3/09 | (2021.01) |
| C25B 3/23 | (2021.01) |
| C25B 11/061 | (2021.01) |
| C25B 11/065 | (2021.01) |
| C25B 11/077 | (2021.01) |
| C25B 11/081 | (2021.01) |
| C25B 15/027 | (2021.01) |

(52) U.S. Cl.
CPC ............... *C25B 3/07* (2021.01); *C25B 3/23* (2021.01); *C25B 11/061* (2021.01); *C25B 11/065* (2021.01); *C25B 11/077* (2021.01); *C25B 11/081* (2021.01); *C25B 15/027* (2021.01)

(58) Field of Classification Search
CPC ............... C25B 3/07; C25B 3/23; C25B 3/09
USPC ............... 205/439, 440, 447, 452, 455, 449
See application file for complete search history.

(56) References Cited

U.S. PATENT DOCUMENTS

| 4,661,422 A | 4/1987 | Marianowski et al. |
| 2003/0181739 A1 | 9/2003 | Neumann et al. |
| 2007/0282138 A1* | 12/2007 | Richards .................. C01G 1/00 556/9 |
| 2012/0027666 A1* | 2/2012 | Hill .......................... B01J 35/33 502/232 |
| 2017/0057897 A1 | 3/2017 | Neumann et al. |
| 2018/0044804 A1* | 2/2018 | Hunter .................. C25B 11/051 |
| 2020/0123669 A1 | 4/2020 | Neumann et al. |

FOREIGN PATENT DOCUMENTS

| WO | WO 2007/142727 A1 | 12/2007 | |
| WO | WO 2013/057079 A1 | 4/2013 | |
| WO | WO 2015/132780 A1 | 9/2015 | |
| WO | WO-2018225066 A1 * | 12/2018 | ......... C25B 11/0447 |
| WO | WO-2021243199 A1 * | 12/2021 | ............ C25B 11/03 |

OTHER PUBLICATIONS

Lv et al., "Cu-Based Polyoxometalate Catalyst for Efficient Catalytic Hydrogen Evolution," Inorganic Chemistry (Jul. 5, 2016), vol. 55, No. 13, pp. 6750-6758. (Year: 2016).*
Von Allmen et al., "Synthesis and Characterization of 0D-3D Copper-Containing Tungstobismuthates Obtained from the Lacunary Precursor Na9[B-α-BiW9O33]," Inorganic Chemistry (Jan. 3, 2017), vol. 56, No. 1, pp. 327-335. (Year: 2017).*
Singh et al., "Water Oxidation Catalysts Based on Abundant 1st Row Transition Metals," Coordination Chemistry Reviews (Sep. 1, 2013), vol. 257, Nos. 17-18, pp. 2607-2622. (Year: 2013).*
Alayon et al. "Reaction conditions of methane-to-methanol conversion affect the structure of active copper sites" ACS Catalysis. Jan. 3, 2014;4(1):16-22.
Arakawa et al. "Catalysis research of relevance to carbon management: progress, challenges, and opportunities" Chemical reviews. Apr. 11, 2001:101(4):953-96.
Ben-Daniel et al. "Activation of nitrous oxide and selective epoxidation of alkenes catalyzed by the manganese-substituted polyoxometalate, [MnIII2ZnW (Zn2W9O34) 2] 10" Journal of the American Chemical Society. Jul. 31, 2002;124(30):8788-9.
Bergman RG. "C-H activation" Nature. Mar. 22, 2007;446(7134):391-3.
Botar et al. "The true nature of the di-iron (III) γ-Keggin structure in water: Catalytic aerobic oxidation and chemistry of an unsymmetrical trimer" Journal of the American Chemical Society. Aug. 30, 2006;128(34):11268-77.
Bugnola et al. "Aerobic Electrochemical Oxygenation of Light Hydrocarbons Catalyzed by an Iron-Tungsten Oxide Molecular Capsule" ACS Catalysis. Mar. 9, 2018;8(4):3232-6.
Bugnola et al. "Reductive electrochemical activation of molecular oxygen catalyzed by an iron-tungstate oxide capsule: reactivity studies consistent with compound I type oxidants" ACS Catalysis. Mar. 11, 2020;10(7):4227-37.

(Continued)

*Primary Examiner* — Edna Wong
(74) *Attorney, Agent, or Firm* — Mark S. Cohen; PEARL COHEN ZEDEK LATZER BARATZ LLP

(57) ABSTRACT

This invention is directed to a method of oxygenating hydrocarbons with molecular oxygen, $O_2$, as oxidant under electrochemical reducing conditions, using polyoxometalate compounds containing copper such as $Q_{10}[Cu_4(H_2O)_2(B\text{-}\alpha\text{-}PW_9O_{34})_2]$ or $Q_{13}\{[Cu(H_2O)]_3[(A\text{-}\alpha\text{-}PW_9O_{34})_2(NO_3)]^-\}$ or solvates thereof as catalysts, wherein Q are each independently selected from alkali metal cations, alkaline earth metal cations, transition metal cations, $NH_4^+$, $H^+$ or any combination thereof.

27 Claims, No Drawings

(56) References Cited

OTHER PUBLICATIONS

Cho et al. "To rebound or dissociate? This is the mechanistic question in C-H hydroxylation by heme and nonheme metal-oxo complexes" Chemical Society Reviews. 2016;45(5):1197-210.

Creager et al. "An efficient electrocatalytic model cytochrome P-450 epoxidation cycle" Journal of the American Chemical Society. Jul. 1986;108(14):4225-7.

Dimitratos et al. "Effect of Brønsted acidity in propane oxidation over Cs2. 5H1. 5PV1Mo11—xWxO40 polyoxometallate compounds" Catalysis Communications. Oct. 1, 2006;7(10):811-8.

Engelmann et al. "Oxidation Reactions with Bioinspired Mononuclear Non-Heme Metal-Oxo Complexes" Angewandte Chemie International Edition. Jun. 27, 2016;55(27):7632-49.

Folkman et al. "Electrochemical water oxidation catalysis beginning with Co (II) polyoxometalates: The case of the precatalyst Co4V2W18O6810-" ACS Catalysis. Jan. 6, 2017;7(1):7-16.

Hill et al. "Sustained epoxidation of olefins by oxygen donors catalyzed by transition metal-substituted polyoxometalates, oxidatively resistant inorganic analogs of metalloporphyrins" Journal of the American Chemical Society. Feb. 1986;108(3):536-8.

Hong et al. "Dioxygen activation chemistry by synthetic mononuclear nonheme iron, copper and chromium complexes" Coordination Chemistry Reviews. Mar. 1, 2017;334:25-42.

Horwitz et al. "Electrocatalytic olefin epoxidation using manganese Schiff-base complexes and dioxygen" Inorganic Chemistry. Mar. 1990;29(5):1006-11.

Huang et al. "Beyond ferryl-mediated hydroxylation: 40 years of the rebound mechanism and C-H activation" JBIC Journal of Biological Inorganic Chemistry. Apr. 2017;22:185-207.

International Search for PCT Application No. PCT/IL2021/050734 dated Oct. 12, 2021.

Knoth et al. "Heteropolyanions of the types M3 (W9PO34) 212-and MM'M"(W9PO34) 212 -: novel coordination of nitrate and nitrite" Inorganic Chemistry. May 1986;25(10):1577-84.

Kopilevich et al. "Amplified rate acceleration by simultaneous up-regulation of multiple active sites in an endo-functionalized porous capsule" Journal of the American Chemical Society. Oct. 14, 2015;137(40):12740-3.

Kopilevich et al. "Catalysis in a porous molecular capsule: Activation by regulated access to sixty metal centers spanning a truncated icosahedron" Journal of the American Chemical Society. Aug. 8, 2012;134(31):13082-8.

Kopilevich et al. "The uptake and assembly of alkanes within a porous nanocapsule in water: New information about hydrophobic confinement" Angewandte Chemie. Mar. 24, 2016;128(14):4552-7.

Kuepper et al. "Electronic structure and soft-X-ray-induced photoreduction studies of iron-based magnetic polyoxometalates of type {(M) M 5} 12 Fe III 30 (M=Mo Vl, W Vl)" Dalton Transactions. 2013;42(22):7924-35.

Mansuy et al. "Highly oxidation resistant inorganic-porphyrin analog polyoxometalate oxidation catalysts. 2. Catalysis of olefin epoxidation and aliphatic and aromatic hydroxylations starting from. alpha. 2-P2W17O61 (Mn+. cntdot. Br) (n-11)(Mn+=Mn3+, Fe3+, Co2+, Ni2+, Cu2+), including quantitative comparisons to metalloporphyrin catalysts"'s Journal of the American Chemical Society. Sep. 1991;113(19):7222-6.

Michida et al. "Epoxidation with an electrocatalytic P-450 model system in an acidic solution" Chemical and pharmaceutical bulletin. 2005;53(2):151-2.

Narsimhan et al. "Catalytic oxidation of methane into methanol over copper-exchanged zeolites with oxygen at low temperature" ACS central science. Jun. 22, 2016;2(6):424-9.

Nastri et al. "Design and engineering of artificial oxygen-activating metalloenzymes" Chemical Society Reviews. 2016;45(18):5020-54.

Neumann R. "Activation of molecular oxygen, polyoxometalates, and liquid-phase catalytic oxidation" Inorganic chemistry. Apr. 19, 2010;49(8):3594-601. Abstract.

Pannov et al. "The role of iron in N2O decomposition on ZSM-5 zeolite and reactivity of the surface oxygen formed" Journal of molecular catalysis. Jul. 15, 1990;61(1):85-97.

Que et al. "Biologically inspired oxidation catalysis" Nature. Sep. 18, 2008;455(7211):333-40.

Quist et al. "Activation of dioxygen by copper metalloproteins and insights from model complexes" JBIC Journal of Biological Inorganic Chemistry. Apr. 2017;22:253-88.

Rosu et al. "X-ray structure of dodecasodium tricopper (II) bis [nonatungstabismuthate (III) hydrate, a polyoxometalate salt containing α-B-BIW 9 O 33 units" Journal of chemical crystallography. Oct. 2003;33:751-5.

Rubinstein et al. "Aerobic carbon-carbon bond cleavage of alkenes to aldehydes catalyzed by first-row transition-metal-substituted polyoxometalates in the presence of nitrogen dioxide" Journal of the American Chemical Society. Aug. 6, 2014;136(31):10941-8.

Sadakane et al. "Electrochemical properties of polyoxometalates as electrocatalysts" Chemical reviews. Feb. 5, 1998;98(1):219-38.

Sarma et al. "Oxygenation of methylarenes to benzaldehyde derivatives by a polyoxometalate mediated electron transfer-oxygen transfer reaction in aqueous sulfuric acid" Journal of the American Chemical Society. May 13, 2015;137(18):5916-22.

Sarma et al. "Encapsulation of arenes within a porous molybdenum oxide [Mo132] nanocapsule" Chemistry—A European Journal. Oct. 17, 2016;22(43):15231-6.

Snyder et al. "The active site of low-temperature methane hydroxylation in iron-containing zeolites" Nature. Aug. 18, 2016;536(7616):317-21.

Sun et al. "Catalytic oxidation of light alkanes (C1-C4) by heteropoly compounds" Chemical reviews. Jan. 22, 2014;114(2):981-1019.

Tabushi et al. "P-450-tpye dioxygen activation using hydrogen/colloidal platinum as an effective electron donor" Journal of the American Chemical Society. Dec. 1981;103(24):7371-3.

Todea et al. "Porous capsules {(M) M5} 12FeIII30 (M=MoVl, WVl): sphere surface supramolecular chemistry with 20 ammonium ions, related solution properties, and tuning of magnetic exchange interactions" Angewandte Chemie. Jan. 12, 2010;122(3):524-9.

Tomkins et al. "Direct conversion of methane to methanol under mild conditions over Cu-zeolites and beyond" Accounts of chemical research. Feb. 21, 2017;50(2):418-25.

Tomkins et al. "Isothermal cyclic conversion of methane into methanol over copper-exchanged zeolite at low temperature" Angewandte Chemie. Apr. 25, 2016;128(18):5557-61.

Trehoux et al. "A growing family of O2 activating dinuclear iron enzymes with key catalytic diiron (III)-peroxo intermediates: Biological systems and chemical models" Coordination Chemistry Reviews. Sep. 1, 2016;322:142-58.

Udit et al. "Electrochemical generation of a high-valent state of cytochrome P450" Journal of inorganic biochemistry. Apr. 1, 2006;100(4):519-23.

Wang et al. "Alkane oxidation: methane monooxygenases, related enzymes, and their biomimetics" Chemical reviews. Jul. 12, 2017;117(13):8574-621.

Wang et al. "Partial oxidation of ethane by reductively activated oxygen over iron phosphate catalyst" Journal of catalysis. Oct. 1, 1997;171(1):106-14.

European Search Report for EP21828909.8 dated Jul. 25, 2024.

Gao, S., et al. (2006). Electrochemical behavior and multilayer films of the sandwich-type polyoxotungstate complex {K10Co4 (H2O) 2 (PW9O34) 2}. Materials Letters, 60(29-30), 3622-3626.

Knoth, W. H., et al. (1986). Heteropolyanions of the types M3 (W9PO34) 212-and MM'M"(W9PO34) 212-: novel coordination of nitrate and nitrite. Inorganic Chemistry, 25(10), 1577-1584.

* cited by examiner

AEROBIC ELECTROCATALYTIC OXIDATION OF HYDROCARBONS

CROSS-REFERENCE TO RELATED APPLICATIONS

This application is a National Phase Application of PCT International Application No. PCT/IL2021/050734, International Filing Date 17 Jun. 2021, claiming the benefit of Israeli Patent Application No. 275588, filed 22 Jun. 2020 which are hereby incorporated by reference.

FIELD OF THE INVENTION

This invention is directed to a method of oxygenating hydrocarbons with molecular oxygen, $O_2$, as oxidant under electrochemical reducing conditions, using polyoxometalate compounds containing copper such as $Q_{10}[Cu_4(H_2O)_2(B\text{-}\alpha\text{-}PW_9O_{34})_2]$ or $Q_{13}\{[Cu(H_2O)]_3[(A\text{-}\alpha\text{-}PW_9O_{34})_2(NO_3)^-]\}$ or solvates thereof as catalysts, wherein Q are each independently selected from alkali metal cations, alkaline earth metal cations, transition metal cations, $NH_4^+$, $H^+$ or any combination thereof.

BACKGROUND OF THE INVENTION

The valorization, liquification and/or oxygenation of hydrocarbons with dioxygen from air, especially low molecular weight gaseous alkanes found in natural gas is a major challenge in oxidation catalysis. It also has major implications towards improved utilization of natural gas resources that often are flared off with deleterious net emission of carbon dioxide.

Some desirous transformations include alkane oxidation to alcohols, aldehydes and carboxylic acids as well as alkene epoxidation and further carbon-carbon bond cleavage reactions.

Methane monooxygenase enzymes can catalyze the aerobic oxidation of alkanes under reducing conditions. There are two variants, soluble methane monooxygenase with two iron atoms at the active site and particulate methane monooxygenase, a membrane enzyme thought to have three copper atoms at or near the active site (Wang, V. C.-C.; Maji, S.; Chen, P. P.-Y.; Lee, H. K.; Yu, S. S.; Chan, S. I. Alkane oxidation: Methane monooxygenases, related enzymes, and their biomimetics. *Chem. Rev.* 2017, 117, 8574-8621.)

The ubiquitous nature of copper and iron centers in monooxygenase enzymes has led to long standing efforts to find practical, especially inorganic, synthetic analogs for these enzymes. One active research area is the incorporation of copper into zeolites, clays and metal organic framework materials that has led to demonstrated carbon-hydrogen bond activation of methane to form methanol via proposed active metal-oxo species. Use of oxygen from air as oxidant typically requires a three-step reaction, none of the steps being catalytic, requiring high temperature activation of $O_2$ and use of steam at elevated temperatures to remove methanol from the catalysts (Tomkins, P.; Ranocchiari, M.; van Bolchoven, J. A. Direct conversion of methane to methanol under mild conditions over Cu-Zeolites and beyond. *Acc. Chem. Res.* 50, 418-425 (2017); Narsimhan, K.; Iyoki, K.; Dinh, K.; Román-Leshkov, Y. Catalytic Oxidation of Methane into Methanol over Copper-Exchanged Zeolites with Oxygen at Low Temperature. ACS Cent. Sci. 2, 424-429 (2016). Alayon, E. M. C.; Nachtegaal, M.; Bodi, A.; van Bokhoven, J. A. Reaction Conditions of Methane-to-Methanol Conversion Affect the Structure of Active Copper Sites. ACS Catal. 4,16-22 (2104); and Tomkins, P.; Mansouri, A.; Bozbag, S. E.; Krumeich, F.; Park, M. B.; Alayon, E. M. C.; Ranocchiari, M.; van Bokhoven, J. A. Isothermal Cyclic Conversion of Methane into Methanol over Copper-Exchanged Zeolite at Low Temperature. Angew. Chem. 128, 5557-5561 (2016)).

Although based on copper as the catalytic center, the above-mentioned copper-based compounds and materials do not activate $O_2$ under reducing conditions but rather by application of high temperatures. Thus, dioxygen activation at ambient conditions towards formation of reactive intermediates, followed by actual catalytic transformations, especially of light hydrocarbons and alkanes using intrinsically stable inorganic copper-based catalysts, has not been attained.

Polyoxometalates have been used in very high temperature oxygenation of alkanes, although selectivity and yields are low with significant formation of combustion products. (Sun, M.; Zhang, J.; Putaj, P.; Caps, V.; Lefebvre, F.; Pelletier, J.; Basset, J. M. Catalytic oxidation of light alkanes (C1-C4) by heteropoly compounds. Chem. Rev. 114,981-1019 (2014).). Recently, it has been shown that Keplerates, a sub-class of polyoxometalate compounds, can activate $O_2$ and oxygenate alkanes, arenes, alkenes, ketones, sulfides, and amines in a cathodic electrochemical transformation (Bugnola, M.; Carmieli, R.; Neumann, R. Aerobic Electrochemical Oxygenation of Light Hydrocarbons. *ACS Catalysis,* 2018, 8, 3232-3236; Bugnola, M.; Shen, K.; Haviv, E.; Neumann, R. Reductive Electrochemical Activation of Molecular Oxygen Catalyzed by an Iron-Tungstate Oxide Capsule: Reactivity Studies and Support for an Fe(V)-oxo Active Intermediate. *ACS Catalysis,* 2020, 10, 4227-4237; Neumann R. Bugnola M. Electrochemical Oxidation of Hydrocarbons. PCT/IL2018/050613, WO/2018/225066.)

SUMMARY OF THE INVENTION

In one embodiment, this invention is directed to a method for the preparation of oxygenated hydrocarbon products from a hydrocarbon, comprising the step of contacting a hydrocarbon with molecular oxygen and with a polyoxometalate catalyst of the general formula (1):

or a solvate thereof;
wherein:
i is between 0-50;
j is between 0-16;
k is between 0-20;
l is between 1-20;
m is between 5-50;
n is between 10-400;
each of Q is independently selected from alkali metal cation, alkaline earth metal cation, transition metal cation, $NH_4^+$, $H^+$;
each of X is independently selected P, As, Si, B, Bi, Al, Sb, Ge, Ga, Se or Te;
each of M is independently Ti, V, Cr, Mn, Fe, Co, Ni, Cu, Zn, Nb, Mo, Ru, Rh, Pd, Ag, Re, Os, Ir or Pt;
wherein said contacting step is conducted in an electrochemical cell, said electrochemical cell comprises a cathode, an anode and a catalyst and wherein voltage is applied to said cell, thereby generating the oxygenated hydrocarbon products.

In another embodiment, the polyoxometalate catalyst is represented by formula (2):

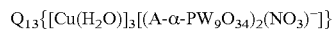

or solvate thereof.

In another embodiment, the polyoxometalate catalyst is represented by formula (3):

$$Q_{13}\{[Cu(H_2O)]_3[(A\text{-}\alpha\text{-}PW_9O_{34})_2(NO_2)^-]\}$$

or solvate thereof.

In another embodiment, the polyoxometalate catalyst is represented by formula (4):

$$Q_{10}[Cu_4(H_2O)_2(B\text{-}\alpha\text{-}PW_9O_{34})_2]$$

or solvate thereof.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In one embodiment, the invention provides a method for the preparation of oxidized hydrocarbon products from a hydrocarbon, comprising the step of contacting a hydrocarbon with a polyoxometalate catalyst or a solvate thereof with a molecular oxygen, wherein said step is conducted in an electrochemical cell, thereby generating the oxidized hydrocarbon products.

In another embodiment, the oxidized hydrocarbon products are oxygenated hydrocarbon products.

In one embodiment, this invention is directed to a method for the preparation of oxygenated hydrocarbon products from a hydrocarbon, comprising the step of contacting a hydrocarbon with molecular oxygen and with a polyoxometalate catalyst of the general formula (1): $Q_i[X_jM_kCu_lW_mO_n]$ or a solvate thereof;

wherein:
- i is between 0-50;
- j is between 0-16;
- k is between 0-20;
- l is between 1-20;
- m is between 5-50
- n is between 10-400;
- each of Q is independently selected from alkali metal cation, alkaline earth metal cation, transition metal cation, $NH_4^+$, $H^+$;
- each of X is independently P, As, Si, B, Bi, Al, Sb, Ge, Ga, Se or Te;
- each of M is independently Ti, V, Cr, Mn, Fe, Co, Ni, Cu, Zn, Nb, Mo, Ru, Rh, Pd, Ag, Re, Os, Ir or Pt;
- wherein said contacting step is conducted in an electrochemical cell, said electrochemical cell comprises a cathode, an anode and a catalyst and wherein voltage is applied to said cell, thereby generating the oxygenated hydrocarbon products.

In one embodiment, this invention is directed to a method for the preparation of oxygenated hydrocarbon products from a hydrocarbon, comprising the step of contacting a hydrocarbon with molecular oxygen and with a polyoxometalate catalyst (2):

$$Q_{13}\{[Cu(H_2O)]_3[(A\text{-}\alpha\text{-}PW_9O_{34})_2(NO_3)^-]\}$$

or solvate thereof.

In one embodiment, this invention is directed to a method for the preparation of oxygenated hydrocarbon products from a hydrocarbon, comprising the step of contacting a hydrocarbon with molecular oxygen and with a polyoxometalate catalyst (3):

$$Q_{13}\{[Cu(H_2O)]_3[(A\text{-}\alpha\text{-}PW_9O_{34})_2(NO_2)^-]\}$$

or solvate thereof.

In one embodiment, this invention is directed to a method for the preparation of oxygenated hydrocarbon products from a hydrocarbon, comprising the step of contacting a hydrocarbon with molecular oxygen and with a polyoxometalate catalyst (4):

$$Q_{10}[Cu_4(H_2O)_2(B\text{-}\alpha\text{-}PW_9O_{34})_2]$$

or solvate thereof.

In one embodiment, this invention is directed to a sustainable and green method to produce oxygenated hydrocarbons from hydrocarbons. In another embodiment, such method comprises a catalyst, using cheap and abundant starting materials. In another embodiment, the method is conducted under mild conditions of temperature, voltage and solvent or solvent-less environment.

In view of the mild conditions of the method of this invention, surprisingly good faradaic efficiency and selectivity of the resulting oxygenated hydrocarbons are obtained. In another embodiment, the faradaic efficiency is between 0.01 and 90%. In another embodiment, the faradaic efficiency is between 0.05 and 50%. In another embodiment, the faradaic efficiency is between 1 and 30%. In another embodiment, the selectivity of the resulting oxygenated hydrocarbon is between 50 and 90%. In another embodiment, the selectivity of the resulting oxygenated hydrocarbon is between 90 and 95%. In another embodiment, the selectivity of the resulting oxygenated hydrocarbon is between 95 and 97%. In another embodiment, the selectivity of the resulting oxygenated hydrocarbon is between 97 and 99%. In another embodiment, the selectivity of the resulting oxygenated hydrocarbon is between 99% and 99.999%. In another embodiment, the selectivity of the resulting oxygenated hydrocarbon is above 99%. Each possibility represents a separate embodiment of this invention. In one embodiment, the invention provides a method for the preparation of oxygenated hydrocarbon products from a hydrocarbon, comprising the step of contacting a hydrocarbon with a copper containing polyoxometalate catalyst or a solvate thereof with molecular oxygen. In another embodiment, the molecular oxygen is used as an oxidant in the method of this invention.

In one embodiment, "molecular oxygen" refers herein to pure $O_2$ or to any gas composition comprising $O_2$. In another embodiment, a gas composition comprising $O_2$ includes air, diluted air, concentrated air, mixtures of $O_2$ and an inert gas, mixtures of $O_2$ and hydrocarbon of this invention, or any mixtures thereof. In some embodiments, an inert gas comprises He, $N_2$, Ar or any mixture thereof. Each possibility represents a separate embodiment of the invention.

In another embodiment, the polyoxometalate catalyst is contacted with a gas composition comprising $O_2$.

In some embodiments, a polyoxometalate catalyst of formula (1), (2), (3), or (4) is used in the method of this invention.

In one embodiment, i of formula (1) is between 0-50. In another embodiment, i is between 0-10. In another embodiment, i is between 10-20. In another embodiment, i is between 10-50. In another embodiment, i is between 20-30. In another embodiment, i is between 30-40. In another embodiment, i is between 40-50. In another embodiment, i is 0. In another embodiment, i is 12 or 10. Each possibility represents a separate embodiment of this invention In one embodiment, j of formula (1) is between 0-16. In another embodiment, j is between 0-4. In another embodiment, j is between 4-8. In another embodiment, j is between 8-16. In another embodiment, j is 2. Each possibility represents a separate embodiment of this invention In one embodiment, k of formula (1) is between 0-20. In another embodiment, k is between 0-5. In another embodiment, k is 5-10. In another embodiment, k is between 10-20. In another embodiment, k is 0. Each possibility represents a separate embodiment of this invention In one embodiment, l of formula (1) is between 1-20. In another embodiment, l is between 1-5. In another embodiment, l is between 5-10. In another embodiment, l is between 10-15. In another embodiment, l is between 15-20. In another embodiment, l is 3 or 4. Each possibility represents a separate embodiment of this invention In one embodiment, m of formula (1) is between 5-50. In another embodiment, m is between 5-10. In another embodiment, m is 10-20. In another embodiment, m is between 20-30. In another embodiment, m is between 30-40. In another embodiment, m is between 40-50. In another embodiment, m is 18. Each possibility represents a separate embodiment of this invention In one embodiment, n of formula (1) is between 10-400. In another embodiment, n is between 10-50. In another embodiment, n is between 50-100. In another embodiment, n is between 100-200. In another embodiment, n is between 200-300. In another embodiment, n is between 100-200. In another embodiment, n is between 300-400. In another embodiment, n is between 400-500. In another embodiment, n is 70, 73 or 74. Each possibility represents a separate embodiment of this invention.

In one embodiment, the polyoxometalate catalyst of this invention is stabilized on the exterior by counter cations, denoted as Q.

In some embodiments, Q is a metal cation, $H^+NH_4^+$. In another embodiment, Q is $NH_4^+$. In another embodiment, Q is an alkali metal cation, an alkaline earth metal cation or a transition metal cation. In another embodiment, Q is an alkali metal cation comprising Li, Na, K, Rb or Cs. In one embodiment Q comprises Li, Na, K, Rb, Cs, Be, Mg, Ca, Sr, Ba, Ra, Sc, Ti, V, Cr, Mn, Fe, Co, Ni, Cu, Zn, Zr, Nb, Mo, Tc, Ru, Rh, Pd, Ag, Cd, Hf, Ta, W, Re, Os, Ir, Pt, Au, Hg cation or any combination thereof. Each possibility represents a separate embodiment of this invention. In some embodiments, each oxidation state of the abovementioned metal cations, as known in the art, is a separate embodiment of this invention. In another embodiment, Q is $Cu^{II}$ cation. In some embodiments, Q is solvated. Each solvation state of the abovementioned Q cations, is a separate embodiment of this invention. In another embodiment, the solvation state is a di-, tri-, tetra- or hexa-solvate (two, three, four or six solvent molecules coordinating the cation, respectively). In another embodiment, Q is not solvated. In another embodiment, the Q groups in a polyoxometalate are the same or different from each other. In another embodiment, each of Q is the same. In another embodiment, not all of Q are the same. In another embodiment, $Q_i$ is a combination of cations. In another embodiment, $Q_i$ is a combination of $NH_4^+$, Na cations and Cu cations. In another embodiment, $Q_i$ is $Q_{10}$ or $Q_{13}$. In another embodiment, $Q_{10}$ is $\{K_7Na_3\}^{10+}$. In another embodiment, $Q_{13}$ is $\{HK_{12}\}^{13+}$. Each possibility represents a separate embodiment of this invention.

In some embodiments, M is Ti, V, Cr, Mn, Fe, Co, Ni, Cu, Zn, Nb, Mo, Ru, Rh, Pd, Ag, Re, Os, Ir or Pt. In one embodiment, M is Ti, V, Cr, Mn, Fe, Co, Ni, Cu or Zn. In another embodiment, M is Mn, Fe, Co, Ni or Cu. In one embodiment, M is Nb or Mo. In one embodiment, M is Ru, Rh, Pd, Ag, Re, Os, Ir or Pt. Each possibility represents a separate embodiment of this invention.

In some embodiments, polyoxometalate catalyst of formula (1) is found in solvated forms, for example hydrates. Thus, the present invention provides the use of polyoxometalate solvates, such as but not limited to polyoxometalate hydrates. Other solvate molecules of polyoxometalate catalyst include, but are not limited to diethylether, acetonitrile, dimethylsulfoxide, tetrahydrofuran, methanol, ethanol, sulfolane, dioxane, hexamethylphosphoramide (HMPA), hexamethylphosphorous triamide (HMPT), dimethylformamide (DMF) or dimethylacetamide (DMA) solvates. In one embodiment, the polyoxometalate comprises between 0-100 solvate molecules. In another embodiment, the polyoxometalate comprises between 0-1 solvate molecules. In another embodiment, the polyoxometalate is not solvated. In another embodiment, the polyoxometalate comprises between 1-2 solvate molecules. In another embodiment, the polyoxometalate comprises between 2-5 solvate molecules. In another embodiment, the polyoxometalate comprises between 5-10 solvate molecules. In another embodiment, the polyoxometalate comprises between 10-20 solvate molecules. In another embodiment, the polyoxometalate comprises between 20-50. In another embodiment, the polyoxometalate comprises between 50-100 solvate molecules.

In one embodiment, the method of this invention for the preparation of oxygenated hydrocarbon comprises a hydrocarbon as a reactant. In one embodiment, the hydrocarbon comprises alkanes, alkenes, cycloalkanes, cycloalkenes, arenes, alkylated arenes, alkenylated arenes, heteroarenes, alkylated heteroarenes, alkenylated heteroarenes or any mixture thereof. In another embodiment, the hydrocarbon is a light hydrocarbon. In another embodiment, the hydrocarbon comprises substituted or unsubstituted $C_1$-$C_{10}$ alkenes, $C_1$-$C_{10}$ alkanes, arenes or any combination thereof.

In another embodiment, the hydrocarbon is an alkane. In another embodiment, the hydrocarbon is an alkene. In another embodiment, the hydrocarbon is a cycloalkane. In another embodiment, the hydrocarbon is a cycloalkene. In another embodiment the hydrocarbon is an arene. In another embodiment the hydrocarbon is an alkylated arene. In another embodiment the hydrocarbon is an alkenylated arene. In another embodiment the hydrocarbon is a heteroarene. In another embodiment the hydrocarbon is an alkylated heteroarene. In another embodiment the hydrocarbon is an alkenylated heteroarene.

As used herein alkane refers, in one embodiment, to a saturated aliphatic hydrocarbon, including both straight-chain or branched-chain alkanes. In one embodiment, the alkane has 1-10 carbons. In one embodiment, the alkane has 1-20 carbons. In one embodiment, the alkane compound is methane. In one embodiment, the alkane is ethane. In one embodiment, the alkane is propane. In another embodiment, the alkane is n-butane. In some embodiments, the alkane is isobutane (2-methylpropane), n-pentane, methylbutane (isopentane), neopentane (dimethylpropane), n-hexane, 2-methylpentane (isohexane), 3-methylpentane, 2,3-dimethylbutane, 2,2-dimethylbutane (neohexane), n-heptane, 2-methylhexane (isohexane), 3-methylhexane, 2,3-dimethylpentane, 2,2-dimethylpentane (neoheptane), 2,4-dimethylpentane, 3-ethylpentane, 2,2,3-trimethylbutane, n-octane and/or any isomer thereof, n-nonane and/or any isomer thereof, n-decane and/or any isomer thereof. In another embodiment, the alkane may be optionally substituted by one or more halogens, hydroxides, alkoxides, carboxylic acids, amides, cyano groups, and nitro groups. Each possibility represents a separate embodiment of the invention.

As used herein alkene refers, in one embodiment, to an unsaturated aliphatic hydrocarbon, including straight-chain and branched-chain groups. In one embodiment, the alkene has one double bond. In another embodiment, the alkene has 2-10 carbons. In another embodiment, the alkene has more than one double bond. In another embodiment, the alkene has between 2-6 double bonds, each possibility represents a separate embodiment of this invention. In one embodiment, the alkene has 2-20 carbons. The alkene may be unsubstituted or substituted by one or more halogens, cyano groups, hydroxides, alkoxides, amides, carboxylic acids and nitro groups. Each possibility represents a separate embodiment of the invention. In another embodiment, the alkene is ethylene. In another embodiment, the alkene is maleic acid. In another embodiment, the alkene is propylene. In another embodiment, the alkene is 1-butylene. In another embodiment, the alkene is cis or trans 2-butylene. In some embodiments, non-limiting examples of an alkene include in addition 2-methylprpoene (isobutylene), 1-pentene, cis or trans 2-pentene, 2-methylbut-1-ene, 3-methylbut-1-ene (isopentene), 2-methylbut-2-ene (isoamylene), 1-hexene and/or any isomer thereof, 1-heptene and/or any isomer thereof, 1-octene and/or any isomer thereof, 1-nonene and/or any isomer thereof, 1-decene and/or any isomer thereof and any combination thereof. Each possibility represents a separate embodiment of the invention.

As used herein cycloalkane refers, in one embodiment, to a ring structure comprising carbon atoms as ring atoms, which are saturated, substituted or unsubstituted. In another embodiment the cycloalkane has 3-12 membered ring. In another embodiment the cycloalkane has a 6 membered ring. In another embodiment the cycloalkane has a 5-7 membered ring. In another embodiment the cycloalkane has a 3-8 membered ring. In another embodiment, the cycloalkane may be unsubstituted or substituted by a halogen, an alkyl group, a haloalkyl group, a hydroxide, an alkoxide, an amido, a cyano group, a nitro group, and a carboxylate. In another embodiment, the cycloalkyl ring may be fused to another saturated or unsaturated 3-8 membered ring. Non-limiting examples of cycloalkanes include cyclohexane, cyclopropane cyclopentane, cyclobutane, cycloheptane, cyclooctane, methylcyclohexane, etc. Each possibility represents a separate embodiment of the invention.

As used herein cycloalkene refers, in one embodiment, to a ring structure comprising carbon atoms as ring atoms, which are partially unsaturated, that is having at least one double bond, substituted or unsubstituted. Non-limiting examples of cycloalkenes include cyclohexene, cyclopropene, cyclopentene, cyclobutene, cycloheptene, cyclooctene, cyclooctadiene (COD), etc. Each possibility represents a separate embodiment of the invention.

As used herein arene refers to a compound having an aromatic ring. In one embodiment, non-limiting examples of arenes include benzene, anthracene, phenanthrene, tetracene, pyrene, perylene and naphthalene. Each possibility represents a separate embodiment of the invention.

As used herein, the term alkylated arene refers to arene as described herein that is directly bonded to an alkyl as described herein and can be either substituted or unsubstituted. Exemplary alkylated arenes include, without limitation, toluene, xylene, mesitylene, ethylbenzene and isopropylbenzene. Each possibility represents a separate embodiment of the invention.

As used herein, the term alkenylated arene refers to arene as described herein that is directly bonded to an alkenyl as described herein and can be either substituted or unsubstituted. Exemplary alkenylated arenes include, without limitation, styrene, stilbene and methylstyrene. Each possibility represents a separate embodiment of the invention.

As used herein, the term alkenyl refers to an alkyl group as described herein, having at least one carbon double bond, including straight-chain and branched-chain groups. In one embodiment, the alkene has one double bond. In another embodiment, the alkene has more than one double bond. In another embodiment, the alkene has between 2-6 double bonds, each possibility represents a separate embodiment of this invention. In one embodiment, the alkene has 2-20 carbons. Non-limiting examples include ethylenyl, propylenyl, 2-methylpropyl-1-enyl and butenyl, each possibility represents a separate embodiment of this invention.

A "heteroarene" group refers in one embodiment, to arene as described herein comprising in addition to carbon atoms, sulfur, oxygen, nitrogen or any combination thereof, as part of the ring. In one embodiment, non-limiting examples of heteroarenes include pyrrole, furan, thiophene, imidazole, pyrazole, oxazole, isoxazole, thiazole, isothiazole, and pyridine. Each possibility represents a separate embodiment of this invention.

As used herein, the term alkylated heteroarene refers to heteroarene as described herein that is directly bonded to an alkyl as described herein and can be either substituted or unsubstituted. Exemplary alkylated heteroarenes include, without limitation, methylpyridine, ethylpyridine, methylfuran, and ethylthiophene. Each possibility represents a separate embodiment of this invention.

As used herein, the term alkenylated heteroarene refers to heteroarene as described herein that is directly bonded to an alkenyl as described herein and can be either substituted or unsubstituted. Exemplary alkenylated heteroarenes include, without limitation vinylpyridine and vinylthiophene. Each possibility represents a separate embodiment of this invention.

In one embodiment, this invention provides a method for the preparation of oxidized hydrocarbon products. In another embodiment, this invention provides a method for the preparation of oxygenated hydrocarbon products. In one embodiment, oxygenated hydrocarbon products comprise carbon-carbon bond cleavage products, carbon-hydrogen bond oxygenation products, carbon-carbon bond addition products, epoxides or a combination thereof. In another embodiment, the oxygenated hydrocarbon product is a carbon-carbon bond cleavage product. In another embodiment, the oxygenated hydrocarbon product is a carbon-hydrogen bond oxygenation product. In another embodiment, the oxygenated hydrocarbon product is a carbon-carbon addition product. In another embodiment the oxygenated hydrocarbon is an epoxide. In one embodiment, the oxygenated hydrocarbon product is any combination of the foregoing. In another embodiment, non-limiting examples of the carbon-carbon bond cleavage products are selected from aldehyde and/or hydrate thereof, ketone, carboxylic acid, a-oxo carboxylic acid and any combination thereof. In another embodiment, non-limiting examples of the carbon-hydrogen bond oxygenation product is selected from α-hydroxy carboxylic acid, α-hydroxy aldehyde and/or hydrate thereof, alcohol, diol, aldehyde, ketone, hydroxyarene, dihydroxyarene, and carboxylic acid.

In one embodiment, this invention provides a method for the preparation of formaldehyde monohydrate, formic acid, glycolaldehyde, ethylene glycol and optionally diethylene glycol by oxygenation of ethylene.

In one embodiment, this invention provides a method for the preparation of acetic acid, acetaldehyde, formic acid, formaldehyde and/or the optional hydrate thereof, by oxygenation of propylene.

In one embodiment, this invention provides a method for the preparation of methanol, ethanol, 1,1 ethanediol, acetaldehyde, acetic acid, formaldehyde monohydrate and optionally formic acid by the oxygenation of ethane. In another embodiment, oxygenation of ethane yielded acetic acid with greater than 85% selectivity. The production of acetic acid from ethane in such high selectivity in view of the mild conditions of this invention is surprising. In one embodiment, this invention provides a method for the preparation of methanol, ethanol, 1,1 ethanediol, acetaldehyde, acetic acid and formic acid by the oxygenation of ethane.

In one embodiment, this invention provides a method for the preparation of acetone, propionic acid, acetic acid, formic acid, 2-propanol, formaldehyde and/or the optional hydrate thereof by oxygenation of propane.

In one embodiment, this invention provides a method for the preparation of methanol by oxygenation of methane. In another embodiment, oxygenation of methane yielded methanol with above than 99% selectivity. The production of methanol from methane in such high selectivity in view of the mild conditions of this invention is surprising.

In one embodiment, this invention provides a method for the preparation of tert-butanol, formaldehyde and/or the optional hydrate thereof, acetic acid, formic acid and/or acetone by oxygenation of isobutane.

In one embodiment, this invention provides a method for the preparation of formic acid, hydroquinone, catechol and optionally phenol by the oxygenation of benzene.

In some embodiments, and without being bound to any particular mechanism or theory:
a) at least one of the Cu atoms of the polyoxometalate within the method of this invention is reduced by the applied electrochemical reducing conditions;
b) subsequent contact between the reduced species, the molecular oxygen and the hydrocarbon provides the oxygenated hydrocarbon products; and
c) finally, following the oxygenation of the hydrocarbons, the reoxidized, original oxidation state of Cu in the polyoxometalate is regenerated, "closing" the catalytic cycle, reverting to step (a).

In one embodiment, the method of this invention does not require a solvent, i.e. the reaction conducted is solventless. In another embodiment, the polyoxometalate catalyst of this invention is dissolved in a solvent to form a solvate thereof. In another embodiment, any solvent known in the art to be inert within the reaction conditions of this invention—is suitable. In another embodiment, the solvent is selected from water, acetonitrile, sulfolane, diethyl ether, dimethylformamide (DMF), dimethylacetamide (DMA), dimethyl sulfoxide (DMSO), dioxane, ethanol, hexamethylphosphoramide, (HMPA), hexamethylphosphorous triamide (HMPT), methanol, and any combination thereof. In another embodiment, the solvent is selected from water, sulfolane, acetone, acetic acid, acetonitrile or any combination thereof. Each possibility represents a separate embodiment of the invention. In another embodiment, the solvent is polar. In another embodiment, the solvent is acetonitrile. In another embodiment, the solvent is dioxane. In another embodiment, the solvent is acetic acid. In another embodiment, the solvent is water. In another embodiment, the solvent is sulfolane.

In some embodiments, "faradaic efficiency" is referred herein as the efficiency with which charge (electrons) is transferred in a system facilitating an electrochemical reaction. In one embodiment, the faradaic efficiency of the method of this invention is between 0.1-100%. In one embodiment, the faradaic efficiency of the method of this invention is between 1-80%. In one embodiment, the faradaic efficiency of the method of this invention is between 1-50%. In one embodiment, the faradaic efficiency of the method of this invention is between 5-30%. In one embodiment, the faradaic efficiency of the method of this invention is between 0.1-10%. In one embodiment, the faradaic efficiency of the method of this invention is between 0.1-5%.

In one embodiment, the method of this invention is conducted at various temperatures. In one embodiment, the temperature is between 2-200° C. In another embodiment, the temperature is between 2-100° C. In another embodiment, the temperature is between 180-200° C. In another embodiment, the temperature is between 160-180° C. In another embodiment, the temperature is between 140-160° C. In another embodiment, the temperature is between 120-140° C. In another embodiment, the temperature is between 100-120° C. In another embodiment, the temperature is between 80-100° C. In another embodiment, the temperature is between 60-80° C. In another embodiment, the temperature is between 40-60° C. In another embodiment, the temperature is between 20-40° C. In another embodiment, the temperature is between 2-20° C. In another embodiment, the temperature is between 2-10° C. In another embodiment, the temperature is between 2-5° C. In another embodiment, the temperature is between 5-10° C. In another embodiment, the temperature is between 10-15° C. In another embodiment, the temperature is between 15-20° C. In another embodiment, the reaction is conducted at room temperature.

In some embodiments, the volume ratio between the molecular oxygen and the hydrocarbon (gas) is between 0.001-99.999% oxidant and 99.999-0.001% hydrocarbon (v/v). In another embodiment, the volume ratio between the molecular oxygen and the hydrocarbon (gas) is 0.001-1% oxidant and 99.999-99% hydrocarbon. In another embodiment, 1-10% molecular oxygen and 99-90% hydrocarbon. In another embodiment, 5-15% molecular oxygen and 95-85% hydrocarbon. In another embodiment, 5-20% oxidant and 95-80% hydrocarbon. In another embodiment, 50-80% oxidant and 50-20% hydrocarbon.

In one embodiment, the method of this invention is conducted under a total pressure of between 0.01-100 bar. In one embodiment, the "total pressure" refers to the sum of the partial pressures of all gaseous components included in the cell of this invention including a hydrocarbon(if gas), molecular oxygen or a gas composition comprising $O_2$, as described herein. In another embodiment, the partial pressure of each gaseous component is between 0.01-100 bar. In another embodiment, the total or partial pressure is between 0.01-50 bar. In another embodiment, the total or partial pressure is between 0.01-20 bar. In another embodiment, the total or partial pressure is between 0.1-10 bar. In another embodiment, the total or partial pressure is between 0.5-1 bar. In another embodiment, the total or partial pressure is between 0.95-0.99 bar. In another embodiment, the total or partial pressure is of between 1-5 bar. In another embodiment, the total or partial pressure is between 5-10 bar. In another embodiment, the total or partial pressure is between 10-50 bar. In another embodiment, the total pressure is between 50-100 bar. In another embodiment, the total pressure is 1 bar. In another embodiment, the partial pressure of $O_2$ is between 0.01-0.05 bar. In another embodiment, the partial pressure of the hydrocarbon is 0.95-0.99 bar. In another embodiment, the partial pressure of $O_2$ is 0.05 bar. In another embodiment, the partial pressure of the hydrocarbon is 0.95 bar.

In one embodiment, the step of contacting a hydrocarbon, with polyoxometalate catalyst and a molecular oxygen is conducted under applied voltage in an electrochemical cell. In one embodiment, in a three-electrode cell, the voltage applied ranges between (−1.5V) and (1.5V) (vs. SHE). In another embodiment, the voltage ranges between (−1.5V) and (−1.0V) (vs. SHE). In another embodiment, the voltage is between (−1.0V) and (−0.5V) (vs. SHE). In another embodiment, the voltage is between (−0.5) and (0) V (vs. SHE). In another embodiment, the voltage is between (0) and (0.5) V (vs. SHE). In another embodiment, the voltage is between (0.5) and (1.0) V (vs. SHE). In another embodiment, the voltage is between (1.0V) and (1.5V) (vs. SHE).

In one embodiment, in a two-electrode cell, the cell comprises a cathode and an anode and the cell voltage applied is 1.80V. In one embodiment, the voltage applied to the electrodes of the two-electrode cell ranges between 0V and 2V, between 1V and 2V between 0.5V and 2.5V or between 0.1V and 3V.

In one embodiment, the electrochemical cell of this invention comprises working (cathode) and counter (anode) electrodes. In one embodiment, the electrochemical cell of this invention comprises working, counter and reference electrodes. In one embodiment, any material and shape of electrode as known in the art can be used in this invention. In another embodiment, non-limiting examples of working (cathode) electrode materials include a carbon-based material, a metal or a metal oxide. In another embodiment, the carbon-based material cathode comprises carbon nitrides, glassy carbon, graphite or carbon fibers; the metal and metal oxide cathode comprise titanium, molybdenum or platinum. Each material represents a separate embodiment of the invention. In another embodiment the counter (anode) electrode is platinum or an electrode based on cobalt, manganese, iron, nickel, molybdenum sulfides, ruthenium oxides, iridium oxides, pyrochlores or combinations thereof, known to oxidize water to oxygen and protons and electrons. Each material and combinations thereof represent a separate embodiment of the invention. In another embodiment, non-limiting examples of reference electrodes include silver/silver chloride electrode (SSCE), a silver/silver nitrate electrode, a ferrocene/ferrocenium electrode, a platinum or a saturated calomel electrode (SCE). Each electrode represents a separate embodiment of the invention. In another embodiment, non-limiting examples anode or cathode electrode shapes include discs, cylinders, plates, porous solids, nets, wires, mesh, cloths, or fibers. Each shape or geometry represents a separate embodiment of the invention. In another embodiment, the following setup is utilized: platinum wire as reference electrode, a platinum net as working electrode and a platinum wire as counter electrode. In another embodiment, the following setup is utilized: platinum mesh cathode or a carbon fiber cathode and a platinum wire anode.

In one embodiment, the electrochemical cell of this invention comprises a cathode and anode, and a catalyst. In one embodiment, the catalyst of this invention is used in solid form. In one embodiment, the catalyst of this invention is dissolved in solution. In one embodiment, the solution comprises a solvent and a solute, the solute being the catalyst of this invention. In one embodiment, the solvent is water and the solute is the catalyst of this invention. In one embodiment, the concentration of the solution ranges between 0.1-5 mM. In one embodiment, the concentration of the solution ranges between 0.1-10 wt %/vol.

In one embodiment, the electrolyte further comprises additives, stabilizers, salts, ions, or a combination thereof. In one embodiment, the pH of the electrolyte is adjusted. In one embodiment, the pH of the solution comprising water and the catalyst ranges between 0-14. In other embodiment, the concentration of (OH−) or (H+) in the solution corresponds to a value that is beyond the 0-14 pH range. In one embodiment, the pH value of the solution is acidic. In one embodiment, the pH of the solution is basic. In one embodiment, the solution pH ranges between 6-8, between 5-9, between 4-10, 3-11, 2-12 or 1-13.

In one embodiment, the method of this invention comprises reacting a polyoxometalate of this invention and a hydrocarbon in an electrochemical cell in a batch reaction. In one embodiment, the method of this invention comprises reacting a polyoxometalate of this invention and a hydrocarbon in an electrochemical cell in a batch reactor. In one embodiment, the method of this invention comprises reacting a polyoxometalate of this invention and a hydrocarbon in an electrochemical cell in a continuous flow reaction. In another embodiment, the reaction is conducted in a continuous flow reactor.

In one embodiment, the method of this invention comprises reacting a polyoxometalate of this invention and a hydrocarbon in an electrochemical cell for a period of between 0.1-72 hours. In another embodiment, for 0.1-2 hours. In another embodiment, for 2-5 hours. In another embodiment, for 5-10 hours. In another embodiment, for 10-15 hours. In another embodiment, for 10-20 hours. In another embodiment, for 15-30 hours. In another embodiment, the step is conducted for 20-50 hours. In another embodiment, for 25-72 hours. In another embodiment, for 24 hours.

Definitions

The terms/notions of "A", "B", "α" and "β"—within the $\{PW_9O_{34}\}^{-9}$ (or more generally $\{XM_9O_{34}\}^{charge}$, where X is P, Si, Ge, B etc. and M is W or Mo) fragment of the polyoxometalate compounds used herein, refer to the following. $\{PW_9O_{34}\}^{-9}$ comprises a few triads of $\{W_3O_{13}\}$ which can be connected via edge-, face- or corner-sharing. "α" structure denotes a structure where all $\{W_3O_{13}\}$ triads are equivalent; and "β" structure denotes "α" structure where one $\{W_3O_{13}\}$ triad was rotated 60°. The A-type trilacunary anion $\{PW_9O_{34}\}^{-9}$ is formed when corner shared octahedra are removed and B-type generates when an edge shared triad is eliminated from $\{PW_{12}O_{40}\}^{-3}$.

The term "light hydrocarbon" refers to any hydrocarbon that has between 1-6 carbon atoms.

The term "oxygenation" refers to an oxidation reaction wherein at least one oxygen atom is inserted into the molecule to be oxidized during the reaction.

The term "room temperature" refers to a temperature of between 15-30° C. In another embodiment, room temperature refers to a temperature between 15-20° C. In another embodiment, room temperature refers to a temperature between 20-25° C. In another embodiment, room temperature refers to a temperature between 25-30° C.

The term "oxyanion" refers to an anion comprising at least one oxygen atom and one other element.

The term "carbon-carbon bond cleavage products" refers to products that were obtained upon cleavage or breaking of a carbon-carbon bond within a hydrocarbon used in this invention. Non-limiting examples of carbon-carbon bond cleavage products include aldehyde and/or hydrate thereof, ketone, carboxylic acid and any combination thereof.

The term "carbon-hydrogen bond oxygenation products" refers to products that were obtained upon (at least one) insertion of (at least one) oxygen atom into a carbon-hydrogen bond within a hydrocarbon used in this invention. Non-limiting examples of carbon-hydrogen oxygenation products include α-hydroxy carboxylic acid, diol, α-hydroxy aldehyde and/or hydrate thereof, alcohol, aldehyde, ketone, carboxylic acid and any combination thereof.

The term "redox active" refers to a species that is oxidized or reduced by applying voltage or by reacting with a reductant or oxidant.

The following examples are presented in order to more fully illustrate the preferred embodiments of the invention. They should in no way, however, be construed as limiting the broad scope of the invention.

EXAMPLES

Example 1

Preparation of $K_7Na_3[Cu_4(H_2O)_2(B-\alpha-PW_9O_{34})_2]$ $K_7Na_3[Cu_4(H_2O)_2(B-\alpha-PW_9O_{34})_2]$ was prepared according to the literature procedure (Randall, W. J.; Droege, M. W.; Mizuno, N.; Nomiya, K.; Weakley, T. J. R.; Finke, R. G.; Isern, N.; Saltam J.; Zubieta, J. Inorganic Synthesis volume 31 (p 171); ISBN 0-471-15288-9. Thus, $CuCl_2 \cdot 2H_2O$ (1.55 g, 9.09 mmol) was dissolved in 30 mL water. $Na_9[PW_9O_{34}]$ (12.5 g, 4.5 mmol) was added all at one time as a dry, fine powder. The mixture was vigorously stirred for 10 min then cooled down to 4° C. and the dark green precipitation that formed was removed. KCl (1.05, 14.1 mmol) was then added to the filtrate and the product, $K_7Na_3[Cu_4(H_2O)_2(B-\alpha-PW_9O_{34})_2]$, formed as a green precipitate was collected by filtration.

Example 2

Oxygenation of Propane Catalyzed by $K_7Na_3[Cu_4(H_2O)_2(B-\alpha-PW_9O_{34})_2]$ $K_7Na_3[Cu_4(H_2O)_2(B-\alpha-PW_9O_{34})_2]$ (51 mg, 10 mmol) was dissolved in 2.5 mL water in an electrochemical cell consisting of a platinum wire as reference electrode, a platinum wire counter electrode and platinum net as working electrode. At room temperature the cell was pressurized with 1 bar of air and 2 bars of propane. −0.4 V versus Pt was applied to the electrochemical cell for 20 h and the products were analyzed by $^1H$ NMR. Acetone (9.8 μmol), propionic acid (3.5 μmol), acetic acid (3.1 μmol), formic acid (1.1 μmol), 2-propanol (0.4 μmol), formaldehyde (0.16 μmol) were formed. The faradaic efficiency was 22%.

Example 4

Oxygenation of Ethylene Catalyzed by $K_7Na_3[Cu_4(H_2O)_2(B-\alpha-PW_9O_{34})_2]$ $K_7Na_3[Cu_4(H_2O)_2(B-\alpha-PW_9O_{34})_2]$ (51 mg, 10 mmol) was dissolved in 2.5 ml water in an electrochemical cell consisting of a Platinum wire as reference electrode, a platinum wire counter electrode and a platinum net as working electrode. At room temperature the cell was pressurized with 1 bar of air and 2 bars of ethylene. −0.4V versus SHE was applied to the electrochemical cell for 18 h and the products were analyzed by $^1H$ NMR. Formaldehyde monohydrate (4.64 μmol), formic acid (3.14 μmol), glycolaldehyde (1.44 μmol) and ethylene glycol (1.11 μmol) were formed. The faradaic efficiency was 10%.

Example 4

Oxygenation of Methane Catalyzed by $K_7Na_3[Cu_4(H_2O)_2(B-\alpha-PW_9O_{34})_2]$ $K_7Na_3[Cu_4(H_2O)_2(B-\alpha-PW_9O_{34})_2]$ (51 mg, 10 mmol) was dissolved in 2.5 ml water in an electrochemical cell consisting of a platinum wire as reference electrode, a platinum wire counter electrode and a platinum net as working electrode. At room temperature the cell was pressurized with 1 bar of air and 2 bars of methane. −0.4V versus SHE was applied to the electrochemical cell for 18 h and the products were analyzed by $^1H$ NMR. Methanol (0.17 μmol) and formic acid (0.13 μmol) were formed. The faradaic efficiency was 0.4%.

Example 5

Oxygenation of Ethane Catalyzed by $K_7Na_3[Cu_4(H_2O)_2(B-\alpha-PW_9O_{34})_2]$ $K_7Na_3[Cu_4(H_2O)_2(B-\alpha-PW_9O_{34})_2]$ (51 mg, 10 mmol) was dissolved in 2.5 ml water in an electrochemical cell consisting of a platinum wire as reference electrode, a platinum wire counter electrode and a platinum net as working electrode. At room temperature the cell was pressurized with 1 bar of air and 2 bars of ethane. −0.4V versus SHE was applied to the electrochemical cell for 18 h and the products were analyzed by $^1H$ NMR. Methanol (0.33 μmol), ethanol (1.02 μmol), 1,1 ethanediol (1.07 μmol), acetaldehyde (0.94 μmol), acetic acid (22.78 μmol) and formaldehyde monohydrate (0.56 μmol) were formed. The faradaic efficiency was 34.5%.

Example 6

Oxygenation of Ethane Catalyzed by $K_7Na_3[Cu_4(H_2O)_2(B-\alpha-PW_9O_{34})_2]$ $K_7Na_3[Cu_4(H_2O)_2(B-\alpha-PW_9O_{34})_2]$ (51 mg, 10 mmol) was dissolved in 2.5 ml water in an electrochemical cell consisting of a platinum wire as reference electrode, a platinum wire counter electrode and a platinum net as working electrode. At room temperature the cell was pressurized with 1 bar of air and 4 bars of ethane. −0.4V versus SHE was applied to the electrochemical cell for 18 h and the products were analyzed by $^1H$ NMR. Methanol (0.41 μmol), ethanol (1.27 μmol), 1,1 ethanediol (2.96 μmol), acetaldehyde (2.42 μmol), acetic acid (25.7 μmol), formaldehyde monohydrate (0.52 μmol) and formic acid (2.42 μmol) were formed. The faradaic efficiency was 44%.

Example 7

Oxygenation of Benzene Catalyzed by $K_7Na_3[Cu_4(H_2O)_2(B-\alpha-PW_9O_{34})_2]$ $K_7Na_3[Cu_4(H_2O)_2(B-\alpha-PW_9O_{34})_2]$ (51 mg, 10 mmol) was dissolved in 2.5 ml water in an electrochemical cell consisting of a platinum wire as reference electrode, a platinum wire counter electrode and a platinum net as working electrode. Benzene (0.6 mL) was added to the solution. At room temperature, −0.4V versus SHE was applied to the electrochemical cell for 40 h and the products were analyzed by 1H NMR. Phenol (13 μmol), formic acid (10.4 μmol), hydroquinone (8.8 μmol) and catechol (3.3 μmol) were formed. The faradaic efficiency was 17%.

Example 8

Preparation of $K_{12}H\{[Cu(H_2O)]_3[(A-\alpha-PW_9O_{34})_2(NO_3)^-]\}$

Preparation of $K_{12}H\{[Cu(H_2O)]_3[(A-\alpha-PW_9O_{34})_2(NO_3)^-]\}$ was prepared according to a literature procedure Knoth, W. H.; Domaille, P. J.; Harlow, R. L. Inorg. Chem. 1986, 25, 1577-1584). $Na_9[PW_9O_{34}]$ (10.0 g, 3.67 mmol) and $Cu(NO_3)_2 \cdot H_2O$ (1.7 g. 7 mmol) were dissolved in 80 mL water. Then, KCl (11.33 g) was added and the product formed as green precipitate and collected by filtration.

Example 9

Oxygenation of Propane Catalyzed by $K_{12}H\{[Cu(H_2O)]_3[(A-\alpha-PW_9O_{34})_2(NO_3)^-]\}$ $K_{12}H\{[Cu(H_2O)]_3[(A-\alpha-PW_9O_{34})_2(NO_3)^-]\}$ (60 mg, 11.5 mmol) was dissolved in 2.5 ml water in an electrochemical cell consisting of a platinum wire as reference electrode, a platinum wire counter electrode and a platinum net as working electrode. At room temperature the cell was pressurized with 1 bar of air and 2 bars of propane. −0.45V versus SHE was applied to the electrochemical cell for 25 h and the products were analyzed by $^1$H NMR. Acetone (12.8 μmol), acetic acid (10.6 μmol), propionic acid (3 μmol), formic acid (1.4 μmol), 1,1 ethandiol (0.5 μmol), acetaldehyde (0.26 μmol), formaldehyde (0.16 μmol) and 2-propanol (0.05 μmol) were formed. The faradaic efficiency was 41.3%.

Example 10

Oxygenation of Ethylene Catalyzed by $K_{12}H\{[Cu(H_2O)]_3[(A-\alpha-PW_9O_{34})_2(NO_3)^-]\}$ $K_{12}H\{[Cu(H_2O)]_3[(A-\alpha-PW_9O_{34})_2(NO_3)^-]\}$ (60 mg, 11.5 mmol) was dissolved in 2.5 ml water in an electrochemical cell consisting of a Platinum wire as reference electrode, a platinum wire counter electrode and a platinum net as working electrode. At room temperature the cell was pressurized with 1 bar of air and 2 bars of ethylene. −0.45V versus SHE was applied to the electrochemical cell for 25 h and the products were analyzed by $^1$H NMR. Formaldehyde monohydrate (6.69 μmol), formic acid (9.02 μmol), diethylene glycol (7.02 μmol) glycolaldehyde (1.99 μmol) and ethylene glycol (0.36 μmol) were formed. The faradaic efficiency was 35.5%.

Example 11

Oxygenation of Methane Catalyzed by $K_{12}H\{[Cu(H_2O)]_3[(A-\alpha-PW_9O_{34})_2(NO_3)^-]\}$ $K_{12}H\{[Cu(H_2O)]_3[(A-\alpha-PW_9O_{34})_2(NO_3)^-]\}$ (60 mg, 11.5 mmol) was dissolved in 2.5 ml water in an electrochemical cell consisting of a Platinum wire as reference electrode, a platinum wire counter electrode and a platinum net as working electrode. At room temperature the cell was pressurized with 1 bar of air and 2 bars of methane. −0.45V versus SHE was applied to the electrochemical cell for 25 h and the products were analyzed by $^1$H NMR. Methanol (0.065 μmol) was formed. The faradaic efficiency was 0.04%.

Example 12

Oxygenation of Ethane Catalyzed by $K_{12}H\{[Cu(H_2O)]_3[(A-\alpha-PW_9O_{34})_2(NO_3)^-]\}$ $K_{12}H\{[Cu(H_2O)]_3[(A-\alpha-PW_9O_{34})_2(NO_3)^-]\}$ (60 mg, 11.5 mmol) was dissolved in 2.5 ml water in an electrochemical cell consisting of a platinum wire as reference electrode, a platinum wire counter electrode and a platinum net as working electrode. At room temperature the cell was pressurized with 1 bar of air and 2 bars of ethane. −0.45V versus SHE was applied to the electrochemical cell for 25 h and the products were analyzed by $^1$H NMR. Methanol (0.22 μmol), ethanol (0.45 μmol), 1,1 ethandiol (1.24 μmol), acetaldehyde (0.91 μmol), acetic acid (12.07 μmol) and formic acid (1.24 μmol) were formed. The faradaic efficiency was 49.7%.

Example 13

Oxygenation of Benzene Catalyzed $K_{12}H\{[Cu(H_2O)]_3[(A-\alpha-PW_9O_{34})_2(NO_3)^-]\}$ $K_{12}H\{[Cu(H_2O)]_3[(A-\alpha-PW_9O_{34})_2(NO_3)^-]\}$ (60 mg, 11.5 mmol) was dissolved in 2.5 ml water in an electrochemical cell consisting of a Platinum wire as reference electrode, a platinum wire counter electrode and a platinum net as working electrode. Benzene (0.4 mL) was added. At room temperature, −0.45V versus SHE was applied to the electrochemical cell for 25 h and the products were analyzed by $^1$H NMR. Hydroquinone (12.99 μmol), formic acid (7.84 μmol), phenol (4.05 μmol), and catechol (2.84 μmol) were formed. The faradic efficiency was 11.8%.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for the preparation of oxygenated hydrocarbon products from a hydrocarbon under electrochemical reducing conditions, comprising the step of (a) contacting a hydrocarbon with molecular oxygen and with a polyoxometalate catalyst of the general formula (1):

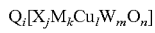

or a solvate thereof;
wherein:
  i is between 0-50;
  j is between 0-4;
  k is 0;
  l is between 1-5;
  m is between 10-20;
  n is between 50-100;
  each of Q is independently selected from alkali metal cation, alkaline earth metal cation, transition metal cation, $NH_4^+$ and $H^+$;
  each of X is independently P, As, Si, B or Al;
  each of M is independently Ti, V, Cr, Mn, Fe, Co, Ni, Cu, Zn, Nb, Mo, Ru, Rh, Pd, Ag, Re, Os, Ir or Pt;

wherein said contacting step (a) is conducted in an electrochemical cell, said electrochemical cell comprises a cathode, an anode and the polyoxometalate catalyst and wherein a voltage is applied to said cell, thereby generating oxygenated hydrocarbon products;

wherein in step (a) one or more of the Cu atoms in the polyoxometalate catalyst is reduced by applied electrochemical reducing conditions to form reduced Cu atoms;

subsequent contact of the polyoxometalate catalyst with the reduced Cu atoms, with the molecular oxygen and the hydrocarbon, the hydrocarbon oxygenates to obtain the oxygenated hydrocarbon products; and following the oxygenation of the hydrocarbons, the reduced Cu atoms in the polyoxometalate catalyst are reoxidized to their original oxidation state.

2. The method of claim 1, wherein Q is an alkali metal cation comprising Li, Na, K, Rb or Cs.

3. The method of claim 1, wherein at least one of Q is $K^+$ or $Na^+$.

4. The method of claim 1, wherein M is Mn, Fe, Co, Ni or Cu.

5. The method of claim 1, wherein $Q_i$ is $Q_{10}$ or $Q_{13}$.

6. The method of claim 5, wherein $Q_{10}$ is $\{K_7Na_3\}^{10+}$ or $Q_{13}$ is $\{K_{12}H\}^{13+}$.

7. The method of claim 1, wherein said molecular oxygen is a gas composition comprising $O_2$, or pure $O_2$.

8. The method of claim 7, wherein said gas composition comprising $O_2$ comprises air, diluted air, concentrated air, a mixture of $O_2$ and inert gas, a mixture of $O_2$ and said hydrocarbon or any mixture thereof.

9. The method of claim 1, wherein said polyoxometalate catalyst is a polyoxometalate of formula (4):

$$Q_{10}Cu_4(H_2O)_2(B\text{-}\alpha\text{-}PW_9O_{34}) \quad (4)$$

or a solvate thereof.

10. The method of claim 1, wherein said polyoxometalate catalyst is dissolved in a solvent to form a solvate thereof.

11. The method of claim 10, wherein said solvent is selected from water, acetone, acetic acid, acetonitrile or any combination thereof.

12. The method of claim 1, wherein said polyoxometalate catalyst is not dissolved in a solvent.

13. The method of claim 1, wherein said hydrocarbon comprises substituted or unsubstituted $C_1\text{-}C_{10}$ alkenes, $C_1\text{-}C_{10}$ alkanes, arenes or any combination thereof.

14. The method of claim 13, wherein said $C_1\text{-}C_{10}$ alkanes comprises methane, ethane, propane or isobutane.

15. The method of claim 13, wherein said $C_1\text{-}C_{10}$ alkenes comprises ethylene, maleic acid or propylene.

16. The method of claim 13, wherein said arene is benzene.

17. The method of claim 1, wherein said oxygenated hydrocarbon products comprise carbon-carbon bond cleavage products, carbon-hydrogen bond oxygenation products, carbon-carbon bond addition products, epoxides or any combination thereof.

18. The method of claim 17, wherein said carbon-carbon bond cleavage products comprise aldehyde and/or hydrate thereof, ketone, a-oxo carboxylic acid or carboxylic acid.

19. The method of claim 17, wherein said carbon-hydrogen bond oxygenation products are selected from a-hydroxy carboxylic acid, α-hydroxy aldehyde, and/or hydrate thereof, alcohol, aldehyde, ketone, epoxide, diol, hydroxyarene, dihydroxy arene and carboxylic acid.

20. The method of claim 1, wherein said step is conducted at a temperature of between 2 and 100° C.

21. The method of claim 20, wherein said temperature is room temperature.

22. The method of claim 1, wherein the cathode comprises a carbon-based material, a metal or a metal oxide.

23. The method of claim 22, wherein the carbon-based material cathode comprises carbon nitrides, glassy carbon, graphite or carbon fibers; the metal and metal oxide cathode comprise titanium, molybdenum or platinum.

24. The method of claim 1, wherein the anode comprises platinum or an electrode based on cobalt, manganese, iron, nickel compounds, molybdenum sulfides, ruthenium oxide, iridium oxide, pyrochlores or combinations thereof.

25. The method of claim 1, wherein the electrochemical cell consists of a platinum wire as reference electrode, a platinum wire as the anode and a platinum net as the cathode.

26. The method of claim 1, wherein the electrochemical cell is a continuous flow reactor.

27. The method of claim 1, wherein j is 2 and m is 18, thus the polyoxometalate catalyst is represented by the following formula:

$$Q_i[X_2Cu_jW_{18}O_n].$$

* * * * *